(12) United States Patent
Gruhike et al.

(10) Patent No.: US 7,777,954 B2
(45) Date of Patent: Aug. 17, 2010

(54) SYSTEMS AND METHODS OF PROVIDING A LIGHT GUIDING LAYER

(75) Inventors: Russell Wayne Gruhike, Santa Clara, CA (US); Mark Mienko, San Jose, CA (US); Gang Xu, Cupertino, CA (US); Ion Bita, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 40 days.

(21) Appl. No.: 11/669,074

(22) Filed: Jan. 30, 2007

(65) Prior Publication Data

US 2008/0180956 A1    Jul. 31, 2008

(51) Int. Cl.
*G02B 5/02* (2006.01)
*F21V 7/04* (2006.01)
*G02B 26/00* (2006.01)

(52) U.S. Cl. .................. 359/599; 362/600; 362/603; 362/609; 362/610; 359/291

(58) Field of Classification Search .............. 349/62, 349/63, 64, 112; 359/291, 599; 362/600, 362/603, 609, 610; 385/146
See application file for complete search history.

(56) References Cited

U.S. PATENT DOCUMENTS

| | | | |
|---|---|---|---|
| 2,518,647 A | 8/1950 | Teeple et al. | |
| 3,813,265 A | 5/1974 | Marks | |
| 3,924,929 A | 12/1975 | Holmen | |
| 4,375,312 A | 3/1983 | Tangonan | |
| 4,378,567 A | 3/1983 | Mir | |
| 4,832,459 A | 5/1989 | Harper | |
| 4,850,682 A | 7/1989 | Gerritsen | |
| 4,961,617 A | 10/1990 | Shahidi | |

(Continued)

FOREIGN PATENT DOCUMENTS

CN         1272922 A      11/2000

(Continued)

OTHER PUBLICATIONS

Miles, et al., Digital Paper for reflective displays, Journal of the Society for Information Display, San Jose, CA, vol. 11, No. 1, 2003, pp. 209-215.

(Continued)

*Primary Examiner*—David N Spector
(74) *Attorney, Agent, or Firm*—Knobbe Martens Olson & Bear LLP

(57) ABSTRACT

Various embodiments of the invention include an interferometric optical modulator comprising a substrate layer and a light direction layer. Such an interferometric modulator may be integrated with a diffuser layer in a display device in a way that physically integrates the diffuser layer into the light direction layer in a way where the diff-user layer does not interact with light propagating within the light direction layer. As a result, most of the light propagating within the light direction layer does not penetrate into the diffuser which would inhibit performance of the display. In some embodiments, the interface between the diffuser layer and the light direction layer has a lower index of refraction than the light direction layer and the transparent substrate so that total internal reflection occurs at the interface.

41 Claims, 8 Drawing Sheets

U.S. PATENT DOCUMENTS

| | | |
|---|---|---|
| 4,974,942 A | 12/1990 | Gross |
| 5,050,946 A | 9/1991 | Hathaway |
| 5,226,099 A | 7/1993 | Mignardi |
| 5,289,300 A | 2/1994 | Yamazaki |
| 5,339,179 A | 8/1994 | Rudisill et al. |
| 5,398,125 A | 3/1995 | Willet |
| 5,452,385 A | 9/1995 | Izumi |
| 5,467,417 A | 11/1995 | Nakamura |
| 5,481,385 A | 1/1996 | Zimmerman et al. |
| 5,515,184 A | 5/1996 | Caulfield |
| 5,555,160 A | 9/1996 | Tawara |
| 5,592,332 A | 1/1997 | Nishio |
| 5,594,830 A | 1/1997 | Winston |
| 5,638,084 A | 6/1997 | Kalt |
| 5,647,036 A | 7/1997 | Deacon et al. |
| 5,650,865 A | 7/1997 | Smith |
| 5,659,410 A | 8/1997 | Koike |
| 5,671,314 A | 9/1997 | Gregory et al. |
| 5,671,994 A | 9/1997 | Ping-Kuang et al. |
| 5,673,128 A | 9/1997 | Ohta et al. |
| 5,703,667 A | 12/1997 | Ochiai |
| 5,735,590 A | 4/1998 | Kashima |
| 5,771,321 A | 6/1998 | Stern |
| 5,783,614 A | 7/1998 | Chen |
| 5,805,117 A | 9/1998 | Mazurek |
| 5,810,464 A | 9/1998 | Ishikawa |
| 5,815,229 A | 9/1998 | Shapiro |
| 5,854,872 A | 12/1998 | Tai |
| 5,883,684 A | 3/1999 | Millikan et al. |
| 5,892,598 A | 4/1999 | Asakawa et al. |
| 5,913,594 A | 6/1999 | Iimura |
| 5,914,804 A | 6/1999 | Goosen et al. |
| 5,933,183 A | 8/1999 | Enomoto |
| 5,956,106 A | 9/1999 | Petersen |
| 5,982,540 A | 11/1999 | Koike |
| 5,991,073 A | 11/1999 | Woodgate |
| 5,999,239 A | 12/1999 | Larson |
| 6,002,829 A | 12/1999 | Winston |
| 6,014,192 A | 1/2000 | Lehureau |
| 6,040,937 A | 3/2000 | Miles |
| 6,048,071 A | 4/2000 | Sawayama |
| 6,049,317 A | 4/2000 | Thompson et al. |
| 6,055,090 A | 4/2000 | Miles |
| 6,073,034 A | 6/2000 | Jacobsen |
| 6,074,069 A | 6/2000 | Chao-Ching |
| 6,091,469 A * | 7/2000 | Naito ................. 349/113 |
| 6,099,134 A | 8/2000 | Taniguchi |
| 6,128,077 A | 10/2000 | Jovin |
| 6,151,089 A | 11/2000 | Yang et al. |
| 6,195,196 B1 | 2/2001 | Kimura et al. |
| 6,196,691 B1 | 3/2001 | Ochiai |
| 6,199,989 B1 | 3/2001 | Maeda et al. |
| 6,211,976 B1 | 4/2001 | Popovich |
| 6,232,937 B1 | 5/2001 | Jacobsen |
| 6,273,577 B1 | 8/2001 | Goto |
| 6,282,010 B1 | 8/2001 | Sulzbach |
| 6,356,378 B1 | 3/2002 | Huibers |
| 6,371,623 B1 | 4/2002 | Toyoda |
| 6,381,022 B1 | 4/2002 | Zavracky et al. |
| 6,407,785 B1 | 6/2002 | Yamazaki |
| 6,412,969 B1 | 7/2002 | Torihara |
| 6,454,452 B1 | 9/2002 | Sasagawa et al. |
| 6,456,279 B1 | 9/2002 | Kubo |
| 6,478,432 B1 | 11/2002 | Dyner |
| 6,483,613 B1 | 11/2002 | Woodgate et al. |
| 6,493,475 B1 | 12/2002 | Lin |
| 6,504,589 B1 | 1/2003 | Kashima |
| 6,512,626 B1 | 1/2003 | Schmidt |
| 6,522,794 B1 | 2/2003 | Bischel et al. |
| 6,538,813 B1 | 3/2003 | Magno |
| 6,574,033 B1 | 6/2003 | Chui |
| 6,577,429 B1 | 6/2003 | Kurtz |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,631,998 B2 | 10/2003 | Egawa et al. |
| 6,636,322 B1 | 10/2003 | Terashita |
| 6,636,358 B2 | 10/2003 | Umemoto et al. |
| 6,642,913 B1 | 11/2003 | Kimura |
| 6,650,455 B2 | 11/2003 | Miles |
| 6,652,109 B2 | 11/2003 | Nakamura |
| 6,657,683 B2 | 12/2003 | Richard |
| 6,660,997 B2 | 12/2003 | Laberge |
| 6,669,350 B2 | 12/2003 | Yamashita |
| 6,674,562 B1 | 1/2004 | Miles |
| 6,680,792 B2 | 1/2004 | Miles |
| 6,693,690 B2 * | 2/2004 | Umemoto et al. ........... 349/113 |
| 6,709,123 B2 | 3/2004 | Flohr |
| 6,738,194 B1 | 5/2004 | Ramirez |
| 6,742,907 B2 | 6/2004 | Funamoto et al. |
| 6,742,921 B2 * | 6/2004 | Umemoto et al. ........... 362/561 |
| 6,751,023 B2 | 6/2004 | Umemoto et al. |
| 6,760,135 B1 | 7/2004 | Payne |
| 6,761,461 B2 | 7/2004 | Mizutani et al. |
| 6,773,126 B1 | 8/2004 | Hatjasalo et al. |
| 6,774,962 B2 | 8/2004 | Yoon |
| 6,778,746 B2 | 8/2004 | Charlton |
| 6,792,293 B1 | 9/2004 | Awan et al. |
| 6,794,119 B2 | 9/2004 | Miles |
| 6,798,469 B2 | 9/2004 | Kimura |
| 6,819,380 B2 | 11/2004 | Wen et al. |
| 6,822,745 B2 | 11/2004 | De Groot et al. |
| 6,841,787 B2 | 1/2005 | Almogy |
| 6,853,418 B2 | 2/2005 | Suzuki et al. |
| 6,862,141 B2 | 3/2005 | Olczak |
| 6,865,312 B2 | 3/2005 | Niv |
| 6,879,354 B1 | 4/2005 | Sawayama et al. |
| 6,885,377 B2 | 4/2005 | Lim |
| 6,897,855 B1 | 5/2005 | Matthies |
| 6,917,469 B2 | 7/2005 | Momose |
| 6,930,816 B2 | 8/2005 | Mochizuki |
| 6,951,401 B2 | 10/2005 | Van Hees et al. |
| 6,961,045 B2 | 11/2005 | Tsao |
| 6,964,484 B2 | 11/2005 | Gupta et al. |
| 6,967,779 B2 | 11/2005 | Fadel |
| 6,970,031 B1 | 11/2005 | Martin |
| 7,002,726 B2 | 2/2006 | Patel |
| 7,009,754 B2 | 3/2006 | Huibers |
| 7,012,659 B2 | 3/2006 | Smith et al. |
| 7,018,088 B2 | 3/2006 | Yu |
| 7,019,876 B2 | 3/2006 | Yang |
| 7,025,461 B2 | 4/2006 | Veligdan |
| 7,030,949 B2 | 4/2006 | Kashima |
| 7,038,752 B2 | 5/2006 | Lin |
| 7,042,643 B2 | 5/2006 | Miles |
| 7,054,045 B2 | 5/2006 | McPheters |
| 7,061,226 B2 | 6/2006 | Durr |
| 7,064,875 B2 | 6/2006 | Kawano et al. |
| 7,072,093 B2 | 7/2006 | Piehl |
| 7,072,096 B2 | 7/2006 | Holman et al. |
| 7,110,158 B2 | 9/2006 | Miles |
| 7,113,339 B2 | 9/2006 | Taguchi |
| 7,123,216 B1 | 10/2006 | Miles |
| 7,138,984 B1 | 11/2006 | Miles |
| 7,142,347 B2 | 11/2006 | Islam |
| 7,156,546 B2 * | 1/2007 | Higashiyama ............. 362/561 |
| 7,161,136 B1 | 1/2007 | Wenstrand |
| 7,161,730 B2 | 1/2007 | Floyd et al. |
| 7,180,672 B2 | 2/2007 | Olczak |
| 7,206,133 B2 | 4/2007 | Cassarly |
| 7,212,345 B2 | 5/2007 | Wilson |
| 7,218,429 B2 | 5/2007 | Batchko |
| 7,218,812 B2 | 5/2007 | Maxwell |

| | | | | | |
|---|---|---|---|---|---|
| 7,262,754 B1 | 8/2007 | Yamazaki | 2003/0214728 A1 | 11/2003 | Olczak |
| 7,262,916 B2 | 8/2007 | Kao | 2004/0001169 A1 | 1/2004 | Saiki |
| 7,324,284 B2 | 1/2008 | Olczak | 2004/0017599 A1 | 1/2004 | Yang |
| 7,327,510 B2 | 2/2008 | Cummings et al. | 2004/0027315 A1 | 2/2004 | Senda et al. |
| 7,336,329 B2 | 2/2008 | Yoon | 2004/0032401 A1 | 2/2004 | Nakazawa |
| 7,342,705 B2 | 3/2008 | Chui | 2004/0042233 A1 | 3/2004 | Suzuki |
| 7,342,709 B2 | 3/2008 | Lin | 2004/0070711 A1 | 4/2004 | Wen et al. |
| 7,352,501 B2 | 4/2008 | Chopra et al. | 2004/0080938 A1 | 4/2004 | Holman |
| 7,355,780 B2 | 4/2008 | Chui | 2004/0085748 A1 | 5/2004 | Sugiura |
| 7,357,552 B2 | 4/2008 | Takada | 2004/0100796 A1 | 5/2004 | Ward |
| 7,357,557 B2 | 4/2008 | Miyashita | 2004/0109305 A1 | 6/2004 | Chisholm |
| 7,359,011 B2 * | 4/2008 | Hamada et al. ............... 349/63 | 2004/0125048 A1 | 7/2004 | Fukuda |
| 7,366,393 B2 | 4/2008 | Cassarly et al. | 2004/0125281 A1 | 7/2004 | Lin et al. |
| 7,369,294 B2 | 5/2008 | Gally | 2004/0170373 A1 | 9/2004 | Kim |
| 7,380,969 B2 | 6/2008 | Yamashita | 2004/0207995 A1 | 10/2004 | Park |
| 7,380,970 B2 | 6/2008 | Hwang | 2004/0228112 A1 | 11/2004 | Takata |
| 7,389,476 B2 | 6/2008 | Senda et al. | 2004/0233357 A1 | 11/2004 | Fujimori |
| 7,417,784 B2 | 8/2008 | Sasagawa | 2004/0246743 A1 | 12/2004 | Lee |
| 7,450,295 B2 | 11/2008 | Tung | 2005/0010568 A1 | 1/2005 | Nagatomo |
| 7,456,805 B2 | 11/2008 | Ouderkirk | 2005/0024849 A1 | 2/2005 | Parker et al. |
| 7,508,571 B2 | 3/2009 | Gally | 2005/0041175 A1 | 2/2005 | Akiyama |
| 7,515,336 B2 | 4/2009 | Lippey | 2005/0046011 A1 | 3/2005 | Chen |
| 7,532,800 B2 | 5/2009 | Iimura | 2005/0069254 A1 | 3/2005 | Schultheis |
| 7,545,569 B2 | 6/2009 | Cassarly | 2005/0120553 A1 | 6/2005 | Brown et al. |
| 7,564,612 B2 | 7/2009 | Chui | 2005/0133761 A1 | 6/2005 | Thielemans |
| 7,603,001 B2 | 10/2009 | Wang | 2005/0141065 A1 | 6/2005 | Masamoto |
| 2001/0010630 A1 | 8/2001 | Umemoto | 2005/0146897 A1 | 7/2005 | Mimura |
| 2001/0019380 A1 | 9/2001 | Ishihara | 2005/0179977 A1 | 8/2005 | Chui et al. |
| 2001/0019479 A1 | 9/2001 | Nakabayashi et al. | 2005/0195175 A1 | 9/2005 | Anderson |
| 2001/0022636 A1 | 9/2001 | Yang et al. | 2005/0195468 A1 | 9/2005 | Sampsell |
| 2001/0030861 A1 | 10/2001 | Oda | 2005/0231977 A1 | 10/2005 | Hayakawa |
| 2001/0049061 A1 | 12/2001 | Nakagaki | 2005/0248524 A1 | 11/2005 | Feng |
| 2001/0055208 A1 | 12/2001 | Kimura | 2005/0259939 A1 | 11/2005 | Rinko |
| 2002/0006036 A1 | 1/2002 | Egawa | 2005/0271325 A1 | 12/2005 | Anderson |
| 2002/0024711 A1 | 2/2002 | Miles | 2005/0286113 A1 | 12/2005 | Miles |
| 2002/0034071 A1 | 3/2002 | Mabuchi | 2006/0001942 A1 | 1/2006 | Chui et al. |
| 2002/0044445 A1 | 4/2002 | Bohler | 2006/0002141 A1 | 1/2006 | Ouderkirk |
| 2002/0051354 A1 | 5/2002 | Egawa | 2006/0024017 A1 | 2/2006 | Page |
| 2002/0054258 A1 | 5/2002 | Kondo | 2006/0044523 A1 | 3/2006 | Teijido |
| 2002/0054424 A1 | 5/2002 | Miles | 2006/0050032 A1 | 3/2006 | Gunner |
| 2002/0075555 A1 | 6/2002 | Miles | 2006/0051048 A1 | 3/2006 | Gardiner |
| 2002/0080465 A1 | 6/2002 | Han | 2006/0061705 A1 | 3/2006 | Onishi |
| 2002/0105699 A1 | 8/2002 | Miracky et al. | 2006/0062016 A1 | 3/2006 | Dejima |
| 2002/0106182 A1 | 8/2002 | Kawashima | 2006/0066511 A1 | 3/2006 | Chui |
| 2002/0135560 A1 | 9/2002 | Akaoka | 2006/0066541 A1 | 3/2006 | Gally |
| 2002/0149584 A1 | 10/2002 | Simpson et al. | 2006/0066586 A1 * | 3/2006 | Gally et al. ............... 345/173 |
| 2002/0154256 A1 | 10/2002 | Gotoh | 2006/0066783 A1 | 3/2006 | Sampsell |
| 2002/0172039 A1 | 11/2002 | Inditsky | 2006/0066935 A1 | 3/2006 | Cummings |
| 2002/0180910 A1 | 12/2002 | Umemoto | 2006/0067600 A1 | 3/2006 | Gally |
| 2003/0012009 A1 | 1/2003 | Suzuki | 2006/0072315 A1 | 4/2006 | Han et al. |
| 2003/0016930 A1 | 1/2003 | Inditsky | 2006/0072339 A1 | 4/2006 | Li et al. |
| 2003/0030764 A1 | 2/2003 | Lee | 2006/0077123 A1 | 4/2006 | Gally et al. |
| 2003/0043157 A1 | 3/2003 | Miles | 2006/0077124 A1 | 4/2006 | Gally |
| 2003/0067760 A1 | 4/2003 | Jagt | 2006/0077154 A1 | 4/2006 | Gally |
| 2003/0071947 A1 | 4/2003 | Shiraogawa | 2006/0077522 A1 | 4/2006 | Kothari |
| 2003/0083429 A1 | 5/2003 | Smith | 2006/0083028 A1 | 4/2006 | Sun et al. |
| 2003/0086031 A1 | 5/2003 | Taniguchi | 2006/0109682 A1 | 5/2006 | Ko et al. |
| 2003/0090887 A1 | 5/2003 | Igarashi | 2006/0110090 A1 | 5/2006 | Ellwood |
| 2003/0095401 A1 | 5/2003 | Hanson | 2006/0126142 A1 | 6/2006 | Choi |
| 2003/0098957 A1 | 5/2003 | Haldiman | 2006/0132383 A1 | 6/2006 | Gally |
| 2003/0099118 A1 | 5/2003 | Saitoh | 2006/0164861 A1 | 7/2006 | Maeda |
| 2003/0103177 A1 | 6/2003 | Maeda | 2006/0181903 A1 | 8/2006 | Okuwaki |
| 2003/0103344 A1 | 6/2003 | Naiida | 2006/0187676 A1 | 8/2006 | Ishikura |
| 2003/0123245 A1 | 7/2003 | Parker | 2006/0198013 A1 | 9/2006 | Sampsell |
| 2003/0151821 A1 | 8/2003 | Favalora | 2006/0209012 A1 | 9/2006 | Hagood |
| 2003/0160919 A1 | 8/2003 | Yutaka et al. | 2006/0209385 A1 | 9/2006 | Liu |
| 2003/0161040 A1 | 8/2003 | Ishii | 2006/0215958 A1 | 9/2006 | Yeo et al. |
| 2003/0169385 A1 | 9/2003 | Okuwaki | 2006/0265919 A1 | 11/2006 | Huang |
| 2003/0184690 A1 | 10/2003 | Ogiwara et al. | 2006/0268574 A1 | 11/2006 | Jung |
| 2003/0193630 A1 | 10/2003 | Chiou | 2006/0274400 A1 | 12/2006 | Miles |
| 2003/0210222 A1 | 11/2003 | Ogiwara et al. | 2006/0285356 A1 | 12/2006 | Tseng |
| 2003/0210363 A1 | 11/2003 | Yasukawa et al. | 2007/0116424 A1 | 5/2007 | Ting |
| 2003/0210367 A1 | 11/2003 | Nakano | 2007/0147087 A1 | 6/2007 | Parker |

| | | | | | | |
|---|---|---|---|---|---|---|
| 2007/0189036 | A1 | 8/2007 | Chen | EP | 1 577 701 | 9/2005 |
| 2007/0196040 | A1 | 8/2007 | Wang | EP | 1 640 314 | 3/2006 |
| 2007/0201234 | A1 | 8/2007 | Ottermann | EP | 1 640 764 | 3/2006 |
| 2007/0210163 | A1 | 9/2007 | Han | EP | 1 698 918 | 9/2006 |
| 2007/0241340 | A1 | 10/2007 | Pan | EP | 1 734 401 | 12/2006 |
| 2007/0268695 | A1 | 11/2007 | Seetzen | EP | 1 748 305 | 1/2007 |
| 2007/0279727 | A1 | 12/2007 | Gandhi | EP | 1 800 183 | 6/2007 |
| 2007/0292091 | A1 | 12/2007 | Fujii | EP | 1 988 332 | 11/2008 |
| 2007/0297191 | A1 | 12/2007 | Sampsell | EP | 1 988 333 | 11/2008 |
| 2008/0049450 | A1 | 2/2008 | Sampsell | EP | 2 068 180 | 6/2009 |
| 2008/0084600 | A1 | 4/2008 | Bita et al. | EP | 2 068 181 | 6/2009 |
| 2008/0084602 | A1 | 4/2008 | Xu et al. | EP | 2 068 182 | 6/2009 |
| 2008/0090025 | A1 | 4/2008 | Freking | EP | 2 069 684 | 6/2009 |
| 2008/0094853 | A1 | 4/2008 | Kim | EP | 2 069 839 | 6/2009 |
| 2008/0100900 | A1 | 5/2008 | Chui | EP | 2 069 840 | 6/2009 |
| 2008/0112039 | A1 | 5/2008 | Chui | EP | 2 069 841 | 6/2009 |
| 2008/0137175 | A1 | 6/2008 | Lin | GB | 2 260 203 | 4/1993 |
| 2008/0151347 | A1 | 6/2008 | Chui | GB | 2278222 | 11/1994 |
| 2008/0170414 | A1 | 7/2008 | Wang | GB | 2 321 532 | 7/1998 |
| 2008/0232135 | A1 | 9/2008 | Kinder | GB | 2 331 615 | 5/1999 |
| 2008/0267572 | A1 | 10/2008 | Sampsell | GB | 2 340 281 | 2/2000 |
| 2008/0285307 | A1 | 11/2008 | Aylward | GB | 2 351 834 | 1/2001 |
| 2009/0050454 | A1 | 2/2009 | Matsukawa | JP | 60 242408 | 12/1985 |
| 2009/0090611 | A1 | 4/2009 | Zeijlon | JP | 62-009317 | 1/1987 |
| 2009/0097100 | A1* | 4/2009 | Gally et al. ............... 359/291 | JP | 04-081816 | 3/1992 |
| 2009/0126792 | A1* | 5/2009 | Gruhlke et al. ............. 136/259 | JP | 05-281479 | 10/1993 |
| 2009/0147332 | A1 | 6/2009 | Bita et al. | JP | 09 022 012 | 1/1997 |
| 2009/0147535 | A1 | 6/2009 | Mienko | JP | 09 022012 | 1/1997 |
| 2009/0168459 | A1 | 7/2009 | Holman | JP | 09 160032 | 6/1997 |
| 2009/0190373 | A1 | 7/2009 | Bita et al. | JP | 09 311333 | 12/1997 |
| 2009/0201301 | A1 | 8/2009 | Mienko | JP | 10 202948 | 8/1998 |
| 2009/0201565 | A1 | 8/2009 | Bita et al. | JP | 11 174234 | 7/1999 |
| 2009/0201571 | A1* | 8/2009 | Gally et al. ................ 359/315 | JP | 11 211999 | 8/1999 |
| 2009/0231877 | A1 | 9/2009 | Mienko | JP | 11 231321 | 8/1999 |
| 2009/0251752 | A1 | 10/2009 | Gruhlke | JP | 2000 075293 | 3/2000 |

FOREIGN PATENT DOCUMENTS

| | | | | | |
|---|---|---|---|---|---|
| JP | 2000 081848 | 3/2000 |
| JP | 2000 181367 | 6/2000 |
| CN | 1286424 | A | 3/2001 | JP | 2000 193933 | 7/2000 |
| CN | 1381752 | A | 11/2002 | JP | 2000 514568 | 10/2000 |
| DE | 34 02 746 | | 8/1985 | JP | 2000 305074 | 11/2000 |
| DE | 196 22 748 | | 12/1997 | JP | 2001-021883 | 1/2001 |
| DE | 199 42 513 | | 3/2001 | JP | 2001 305312 | 10/2001 |
| DE | 102 28 946 | | 1/2004 | JP | 2001305312 | 10/2001 |
| DE | 102007025092 | | 12/2008 | JP | 2001 343514 | 12/2001 |
| EP | 0 278 038 | | 8/1988 | JP | 2002-090549 | 3/2002 |
| EP | 0 590 511 | | 4/1994 | JP | 2002-108227 | 4/2002 |
| EP | 0 822 441 | | 2/1998 | JP | 2002-174780 | 6/2002 |
| EP | 0 879 991 | | 11/1998 | JP | 2002 196151 | 7/2002 |
| EP | 0 907 050 | | 4/1999 | JP | 2002 245835 | 8/2002 |
| EP | 0 957 392 | | 11/1999 | JP | 2003 007114 | 1/2003 |
| EP | 0 984 314 | | 3/2000 | JP | 2003-057652 | 2/2003 |
| EP | 1 081 633 | | 3/2001 | JP | 2003 066451 | 3/2003 |
| EP | 1 113 218 | | 7/2001 | JP | 2003 173713 | 6/2003 |
| EP | 1 122 586 | | 8/2001 | JP | 2003 188959 | 7/2003 |
| EP | 1 127 984 | | 8/2001 | JP | 2003-315694 | 11/2003 |
| EP | 1 143 270 | | 10/2001 | JP | 2003 344881 | 12/2003 |
| EP | 1 199 512 | | 4/2002 | JP | 2004-206049 | 7/2004 |
| EP | 1 251 454 | | 10/2002 | JP | 2005-259365 | 9/2005 |
| EP | 1 271 223 | | 1/2003 | JP | 2006 107993 | 4/2006 |
| EP | 1 279 892 | | 1/2003 | JP | 2006 120571 | 5/2006 |
| EP | 1 296 094 | | 3/2003 | JP | 11 232919 | 8/2009 |
| EP | 1 306 609 | | 5/2003 | WO | WO 95/01584 | 1/1995 |
| EP | 1 329 664 | | 7/2003 | WO | WO 95/14256 | 5/1995 |
| EP | 1 336 876 | | 8/2003 | WO | WO 97/01240 | 1/1997 |
| EP | 1 347 315 | | 9/2003 | WO | WO 97/17628 | 5/1997 |
| EP | 1 389 775 | | 2/2004 | WO | WO 98/19201 | 5/1998 |
| EP | 1 413 543 | | 4/2004 | WO | WO 98/32047 | 7/1998 |
| EP | 1 437 610 | | 7/2004 | WO | WO 98/35182 | 8/1998 |
| EP | 1 445 629 | | 8/2004 | WO | WO 99/63394 | 12/1999 |
| EP | 1 519 218 | | 3/2005 | WO | WO 00/50807 | 8/2000 |
| EP | 1 531 302 | | 5/2005 | WO | WO 01/29148 | 4/2001 |
| EP | 1 544 537 | | 6/2005 | WO | WO 01/57434 | 8/2001 |
| | | | | WO | WO 01/81994 | 11/2001 |

| | | |
|---|---|---|
| WO | WO 01/84228 | 11/2001 |
| WO | WO 01/84229 | 11/2001 |
| WO | WO 02/06858 | 1/2002 |
| WO | WO 02/071132 | 9/2002 |
| WO | WO 02/097324 | 12/2002 |
| WO | WO 003/007049 | 1/2003 |
| WO | WO 03/032058 | 4/2003 |
| WO | WO 03/038509 | 5/2003 |
| WO | WO 03/056876 | 7/2003 |
| WO | WO 03/062912 | 7/2003 |
| WO | WO 03/075207 | 9/2003 |
| WO | WO 2004/003643 | 1/2004 |
| WO | WO 2004/006003 | 1/2004 |
| WO | WO 2004/015489 | 2/2004 |
| WO | WO 2004/027514 | 4/2004 |
| WO | WO 2004/036270 | 4/2004 |
| WO | WO 2004/088372 | 10/2004 |
| WO | WO 2004/114418 | 12/2004 |
| WO | WO 2005/011012 | 2/2005 |
| WO | WO 2005/076051 | 8/2005 |
| WO | WO 2005/088367 | 9/2005 |
| WO | WO 2005/093490 | 10/2005 |
| WO | WO 2005/111669 | 11/2005 |
| WO | WO 2006/008702 | 1/2006 |
| WO | WO 2006/036440 | 4/2006 |
| WO | WO 2006/036451 | 4/2006 |
| WO | WO 2006/036496 | 4/2006 |
| WO | WO 2006/036588 | 4/2006 |
| WO | WO 2007/064133 | 6/2007 |
| WO | WO 2007/094558 | 8/2007 |
| WO | WO 2007/149474 | 12/2007 |
| WO | WO 2008/027275 | 3/2008 |
| WO | WO 2008/039229 | 4/2008 |
| WO | WO 2008/045200 | 4/2008 |
| WO | WO 2008/045207 A1 * | 4/2008 |
| WO | WO 2008/045218 | 4/2008 |
| WO | WO 2008/045222 | 4/2008 |
| WO | WO 2008/045224 | 4/2008 |
| WO | WO 2008/045310 | 4/2008 |
| WO | WO 2008/045311 | 4/2008 |
| WO | WO 2008/045312 | 4/2008 |
| WO | WO 2008/045362 | 4/2008 |
| WO | WO 2008/045363 | 4/2008 |
| WO | WO 2008/045364 | 4/2008 |
| WO | WO 2008/045462 | 4/2008 |
| WO | WO 2008/045463 | 4/2008 |
| WO | WO 2008/069877 | 6/2008 |
| WO | WO 2008/137299 | 11/2008 |
| WO | WO 2008/145096 | 12/2008 |
| WO | WO 2009/073555 | 6/2009 |
| WO | WO 2009/076075 | 6/2009 |
| WO | WO 2009 085706 | 7/2009 |
| WO | WO 2009/102672 | 8/2009 |
| WO | WO 2009/102731 | 8/2009 |
| WO | WO 2009/102733 | 8/2009 |

OTHER PUBLICATIONS

ISR and WO for PCT/US2007/020969 dated Mar. 5, 2008 (PCT Publication WO 2008/045222).
Office Communication form the USPTO in U.S. Appl. No. 11/544,978 dated Sep. 30, 2008.
ISR and WO for PCT/US2007/020680 dated Jul. 1, 2008 (PCT Publication WO 2008/045200).
ISR and WO for PCT/US2007/020736 dated Jul. 14, 2008 (PCT Publication No. WO 2008/045207).
Amendment and Response in U.S. Appl. No. 11/544,978 dated Jan. 30, 2009.
Office Communication from the USPTO in U.S. Appl. No. 11/544,978 dated Apr. 30, 2009.
International Preliminary Report on Patentability in PCT/US2007/020969 dated Dec. 23, 2008.
Official Communication in European App. No. 07 838 811.3 dated Mar. 19, 2009.
International Search Report and Written Opinion in PCT/US2008/085026 dated Apr. 20, 2009.
Extended Search Report in European App. No. 08153686.4 dated Apr. 17, 2009.
Fan et al., "Channel Drop Filters in Photonic Crystals", Optics Express, vol. 3, No. 1, 1998.
Neal T.D. et. al., "Surface Plasmon enhanced emission from dye doped polymer layers," Optics Express, Optical Society of America, vol. 13, No. 14, Jul. 2005.
Giles et al., "Silicon MEMS Optical Switch Attenuator and Its Use in Lightwave Subsystems", IEEE Journal of Selected Topics in Quanum Electronics, vol. 5. No. 1, Jan./Feb. 1999, pp. 18-25.
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-Mar. 1996.
Mehregany et al., "MEMS Applications in Optical Systems", IEEE/LEOS 1996 Summer Topical Meetings, pp. 75-76, (Aug. 5-9, 1996).
Obi, et. al., "Fabrication of Optical Mems in Sol-Gel Materials," IEEE/LEOS International Conference on Optical Mems, Aug. 2002, Conference Digest, pp. 39-40.
Oliner, "Radiating Elements and Mutual Coupling," Microwave Scanning Antennas, vol. 2, 131-157 and pp. 190-194 (1966).
Goosen, "MEMS-Based Variable Optical Interference Devices," IEEE/LEOS International Conference on Optical Mems, Aug. 2000, Conference Digest, pp. 17-18.
Zhou et al., "Waveguide Panel Display Using Electromechanical Spatial Modulators" SID Digest, vol. XXIX, 1998.
International Search Report and Written Opinion in PCT/US2005/006629 (International Publication No. WO 2005/093492) dated Jun. 6, 2005.
Austrian Search Report for U.S. Appl. No. 11/064,143 dated Aug. 12, 2005 (Publication No. 2006/0132838).
Extended Search Report in European Patent Application No. 05255638.8 (European Publication 1 640 764) mailed on May 4, 2006.
ISR and Written Opinion for PCT/US2007/020911 dated Mar. 18, 2008 (PCT Publication No. WO 2008/045218).
ISR and Written Opinion for PCT/US2007/021378 dated Mar. 5, 2008 (PCT Publication No. WO 2008/045312).
ISR and WO for PCT/US2007/021376 dated Jun. 18, 2008 (PCT Publication No. WO 2008/045311).
ISR and Written Opinion for PCT/US2007/021460 dated May 14, 2008 (PCT Publication No. WO 2008/045364).
Partial International Search Report for PCT/US2007/022736 dated Jun. 16, 2008 (PCT Publication No. WO 2008/069877).
ISR and WO mailed on Dec. 13, 2007 in PCT/US2007/014358 (WO 2007/149474).
ISR and Written Opinion for PCT/US2007/021459 dated May 14, 2008 (PCT Publication No. WO 2008/045363).
ISR and Written Opinion for PCT/US2007/021375 dated May 14, 2008 (PCT Publication No. WO 2008/045310).
ISR and Written Opinion for PCT/US2007/021458 dated May 14, 2008 (PCT Publication No. WO 2008/045362).
ISR and Written Opinion for PCT/US2007/020999 dated Apr. 8, 2008 (PCT Publication No. WO 2008/045224).
International Search Report for PCT/US2007/022736 dated Aug. 14, 2008 (PCT Publication No. WO 2008/069877).
European Search Report in European Application No. 08153436.4 (Publication No. EP 1 988 332) dated Oct. 1, 2008.
European Search Report in European Application No. 08153770.6 (Publication No. EP 1 988 333) dated Sep. 29, 2008.
International Search Report and Written Opinion in International Appliction No. PCT/US2008/061046 dated Oct. 1, 2008.
Written Opinion for International Application No. PCT/US07/04277 dated Apr. 3, 2008 (Publication No. WO 2008/039229).
Extended European Search Report in European Application No. 05255647.9 (Publication No. EP 1 640 314) dated Mar. 12, 2008.

International Search Report and Written Opinion in International Application No. PCT/US2005/002986 (Publication No. WO 2005/076051) dated Jun. 8, 2005.
Austrian Search Report in U.S. Appl. No. 11/036,965 dated Jul. 25, 2005.
Austrian Search Report in U.S. Appl. No. 11/040,824 dated Jul. 14, 2005.
International Search Report and Written Opinion in International Application No. PCT/US2007/018639 dated Mar. 20, 2008 (International Publication No. WO 2008/027275).
International Search Report and Written Opinion in International Application No. PCT/US2005/033056 dated Jan. 30, 2006 (International Publication No. WO 2006/036588).
International Search Report and Written Opinion in International Application No. PCT/US2005/030968 dated Jan. 10, 2006 (International Publication No. WO 2006/036440).
International Search Report and Written Opinion in PCT/US2007/021622 (International Publication No. WO 2008/045462) dated Oct. 22, 2008.
International Search Report and Written Opinion in PCT/US2007/021623(International Publication No. WO 2008/045463) dated Oct. 22, 2008.
Partial International Search Report in PCT/US2008/086875 dated Apr. 16, 2009.
International Search Report and Written Opinion in PCT/US2008/085010 dated Mar. 4, 2009.
Extended Search Report in European App. No. 08153690 dated Mar. 5, 2009.
Extended European Search Report in App. No. 08153691.4 dated Mar. 25, 2009.
Petition dated Dec. 19, 2008 and Documents submitted therewith in U.S. Appl. No. 11/952,941.
Decision on the Petition granted Mar. 6, 2009 in U.S. Appl. No. 11/952,941.
U.S. Appl. No. 11/952,941, filed on Dec. 7, 2007.
Partial International Search Report and invitation to pay additional fees in International App. No. PCT/US2009/033597; dated Mat 19, 2009.
Partial International Search Report and invitation to pay additional fees in International App. No. PCT/US2009/033698; dated May 29, 2009.
Invitation to pay additional fees and Partial International Search Report in PCT/US2009/033701 dated Jun. 4, 2009.
Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.
Yan, et al., "Edge-Lighting Light Guide Plate Based on Micro-Prism for Liquid Crystal Display," Journal of Display Technology, vol. 5, No. 9, pp. 355-357, Sep. 2009.
International Search Report and Written Opinion in PCT/US2005/030441 International Publication No. WO 2006/036415 dated Dec. 12, 2005.
International Search Report and Written Opinion in PCT/US2005/031238 International Publication No. WO 2006/036415 dated Dec. 14, 2005.
International Search Report and Written Opinion in PCT/US2009/033597 International Publication No. WO 2009/102672 dated Sep. 10, 2009.
International Search Report and Written Opinion in PCT/US2009/033698 International Publication No. WO 2009/102731 dated Oct. 9, 2009.
International Search Report and Written Opinion in PCT/US2009/033701 International Publication No. WO 2009/102733 dated Aug. 10, 2009.
International Search Report and Written Opinion in PCT/US2009/040561 dated Jul. 17, 2009.
Office Action in U.S. Appl. No. 11/544,978 (Publication No. 2008-0084602 A1), dated Apr. 30, 2009.
Request for Continued Examination (RCE) and Response to Office Action in U.S. Appl. No. 11/544,978 (Publication No. US 2008-0084602 A1), dated Jul. 29, 2009.
Notice of Allowance in U.S. Appl. No. 11/544,978 (Publication No. US 2008-0084602 A1), dated Nov. 4, 2009.

* cited by examiner

SYSTEMS AND METHODS OF PROVIDING A LIGHT GUIDING LAYER

BACKGROUND

1. Field of the Invention

The field of the invention relates to microelectromechanical systems (MEMS).

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment includes a reflective display including a plurality of display elements. The reflective display comprises a transparent substrate, a light direction layer disposed on the substrate, the light direction layer including a plurality of light redirectors configured to direct at least a portion of incident light toward the substrate, and a diffuser layer physically coupled to and optically distinct from the light direction layer, wherein the light direction layer is located between the diffuser layer and the transparent substrate.

Another embodiment has a reflective display including a plurality of display elements. The reflective display comprises a transparent substrate, a light direction layer disposed on the substrate, the light direction layer including a plurality of light redirectors configured to direct at least a portion of incident light toward the substrate, a reflectance film disposed on the light direction layer, and a diffuser layer physically coupled to and optically distinct from the reflectance film, where the reflectance film is located between the diffuser layer and the light direction layer.

A further embodiment has a reflective display including a plurality of display elements. The reflective display comprises a transparent substrate, a first solid layer with an index of refraction g disposed on the substrate, the layer including a plurality of light redirectors configured to direct at least a portion of incident light toward the substrate, and a second solid layer with an index of refraction d physically coupled to the first solid layer, wherein d is less than g, and wherein the first solid layer is located between the second solid layer and the transparent substrate.

Yet another embodiment has a reflective display including a plurality of display elements. The reflective display comprises means for transmitting light onto a surface of a diffuser layer along a path that is oblique to the diffuser layer, the surface of the diffuser layer facing a transparent substrate, and means for directing at least a portion of said transmitted light towards the transparent substrate.

Another embodiment has a method of illuminating. The method comprises transmitting light onto a surface of a diffuser layer along a path that is oblique to the diff-user layer, the surface of the diffuser layer facing a transparent substrate, and directing at least a portion of said transmitted light towards the transparent substrate.

A further embodiment has a method of illuminating a display. The method comprises transmitting light onto a reflectance film along a path that is oblique to the film, and directing at least a portion of said transmitted light so that directed light is directed along a path that is less oblique to said film than said transmitted light.

Yet another embodiment has a reflective display produced by a process comprising positioning a light direction layer on a transparent substrate, the light redirection layer comprising a plurality of light redirectors configured to direct at least a portion of incident light toward the substrate, and positioning a diffuser layer on the light direction layer.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Various embodiments of the invention include an interferometric optical modulator comprising a substrate layer and a light direction layer. The interferometric modulator may be coupled with a diffuser layer in a display device such that ambient light propagating within the light direction layer does not leak into the diffuser layer. As a result, most of the ambient light propagating within the light direction layer does not erroneously penetrate into the diffuser layer, which would inhibit performance of the display. In some embodiments, the diffuser layer has a lower index of refraction than the light direction layer and the transparent substrate so that total internal reflection occurs at the interface between the diffuser layer and the light direction layer. In other embodiments, a high reflectance thin film between the diffuser layer and light direction layer has a lower index of refraction than the light direction layer and the transparent substrate so that total internal reflection occurs at the interface between the high reflectance thin film and the light direction layer.

Figure 1:
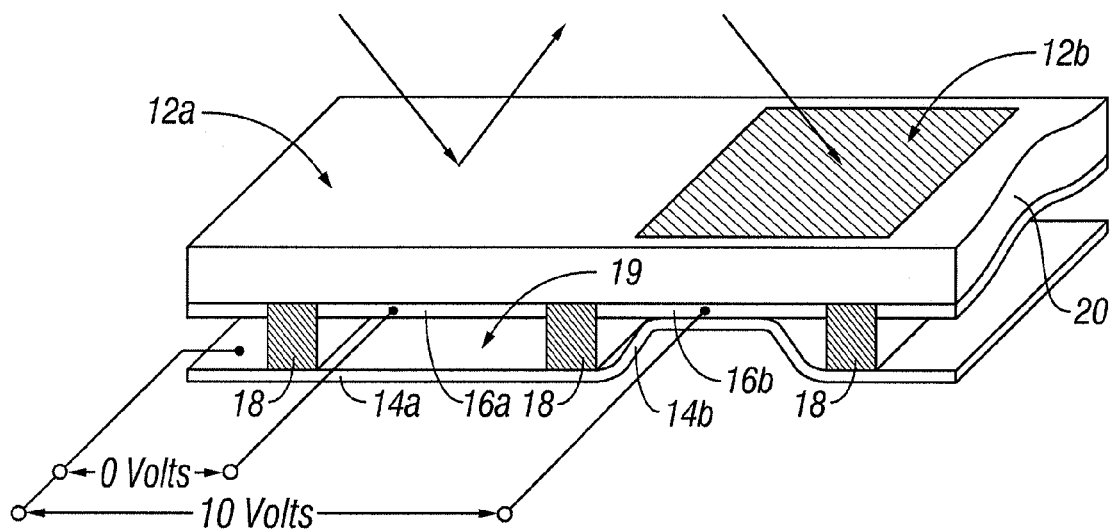
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
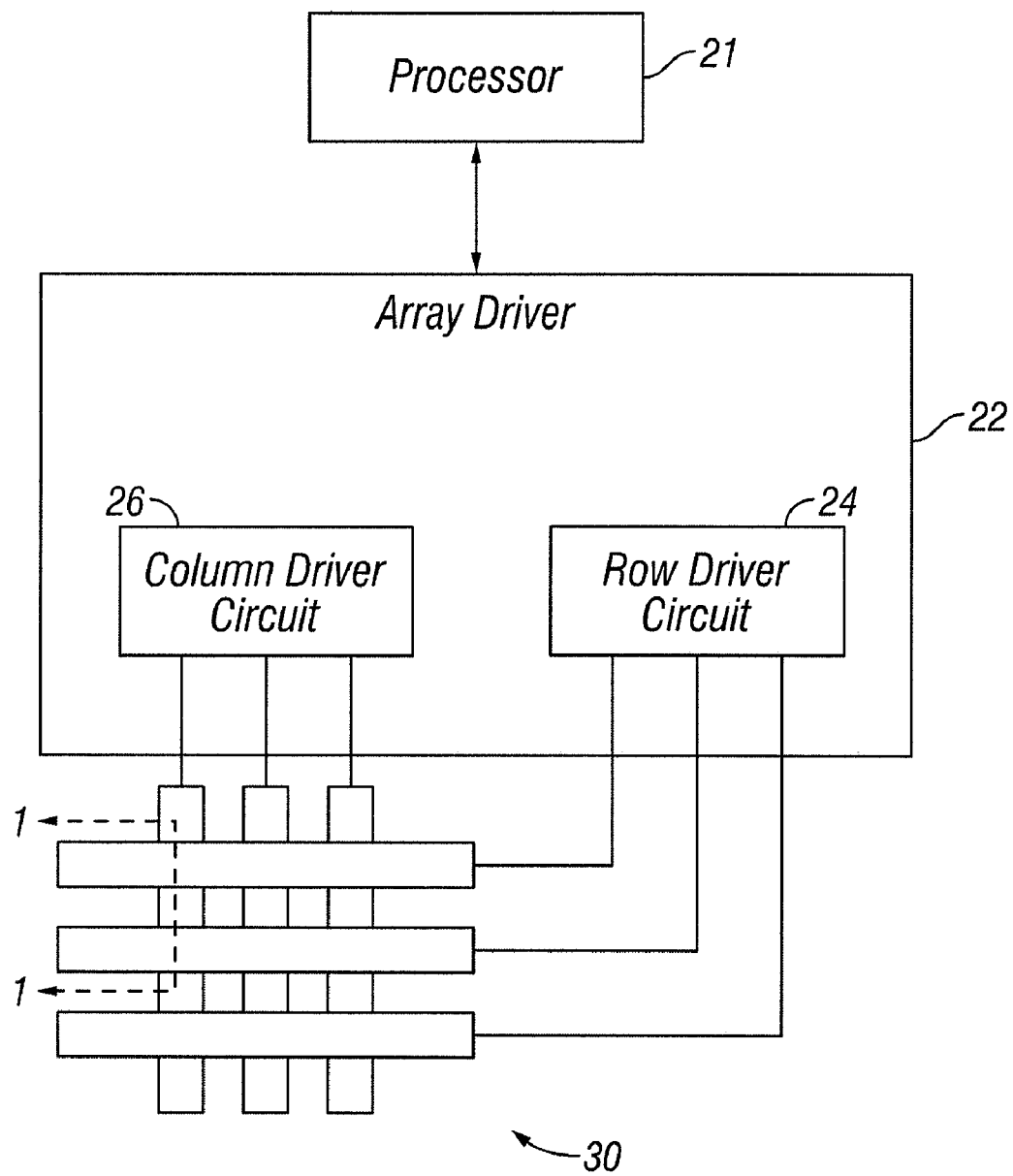
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
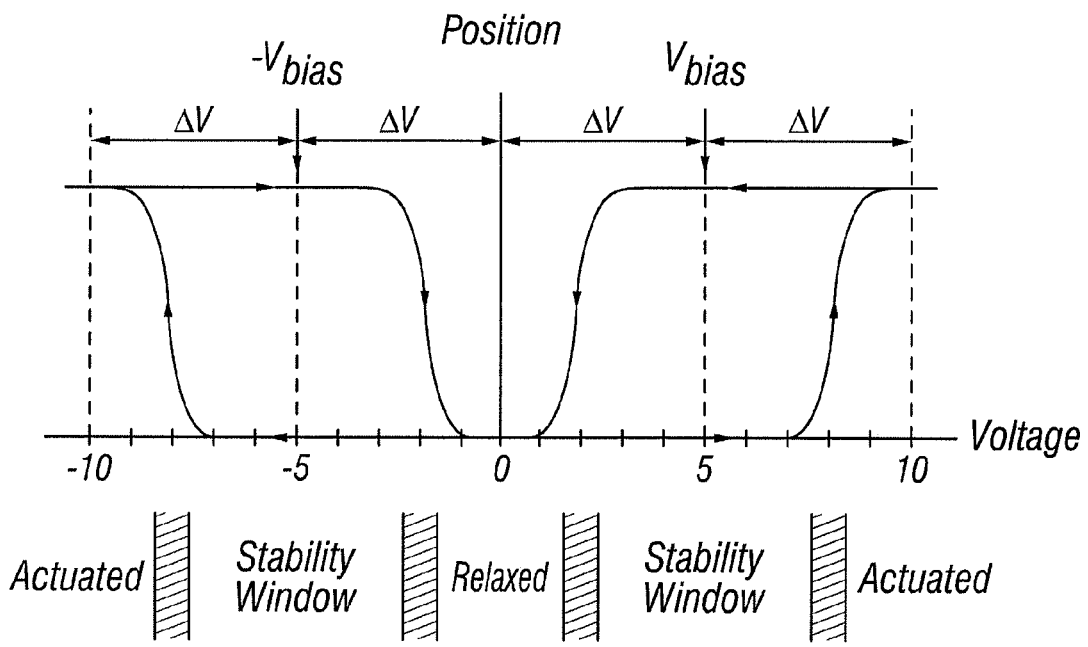
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
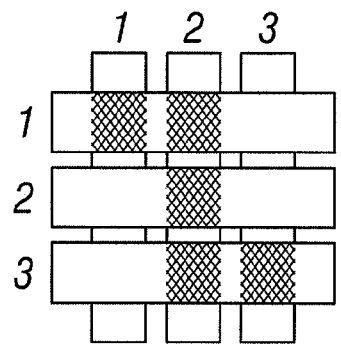
FIG. 5A illustrates one exemplary frame of display data in the 3×3 interferometric modulator display of FIG. 2.
Figure 5B:
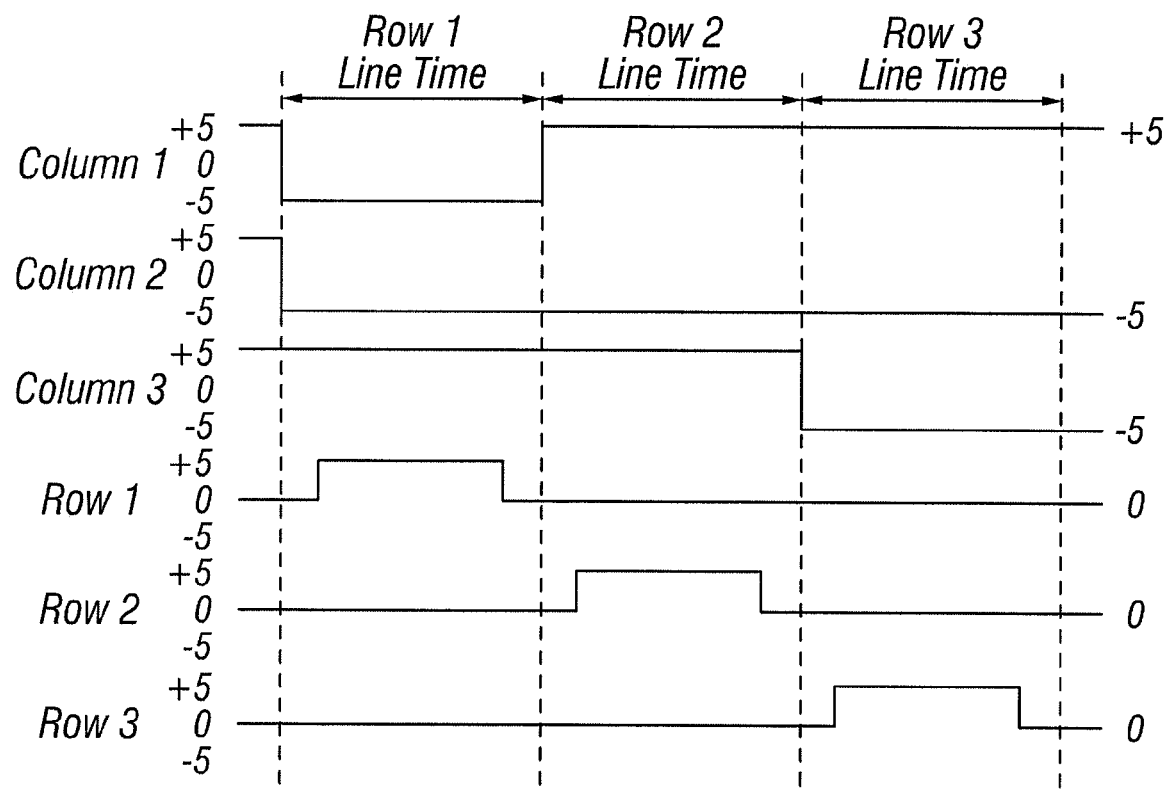
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
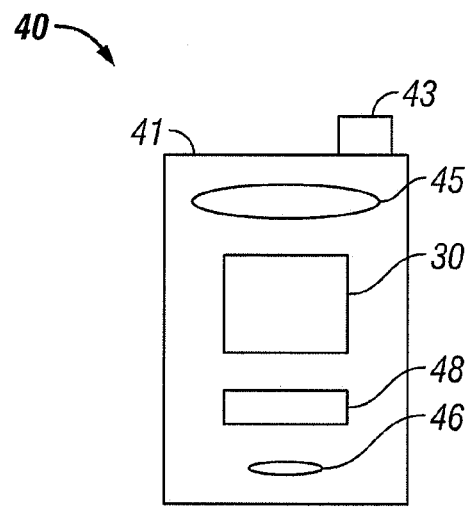
FIGS. 6A and 6B are system block diagrams illustrating an embodiment of a visual display device comprising a plurality of interferometric modulators.
Figure 6B:
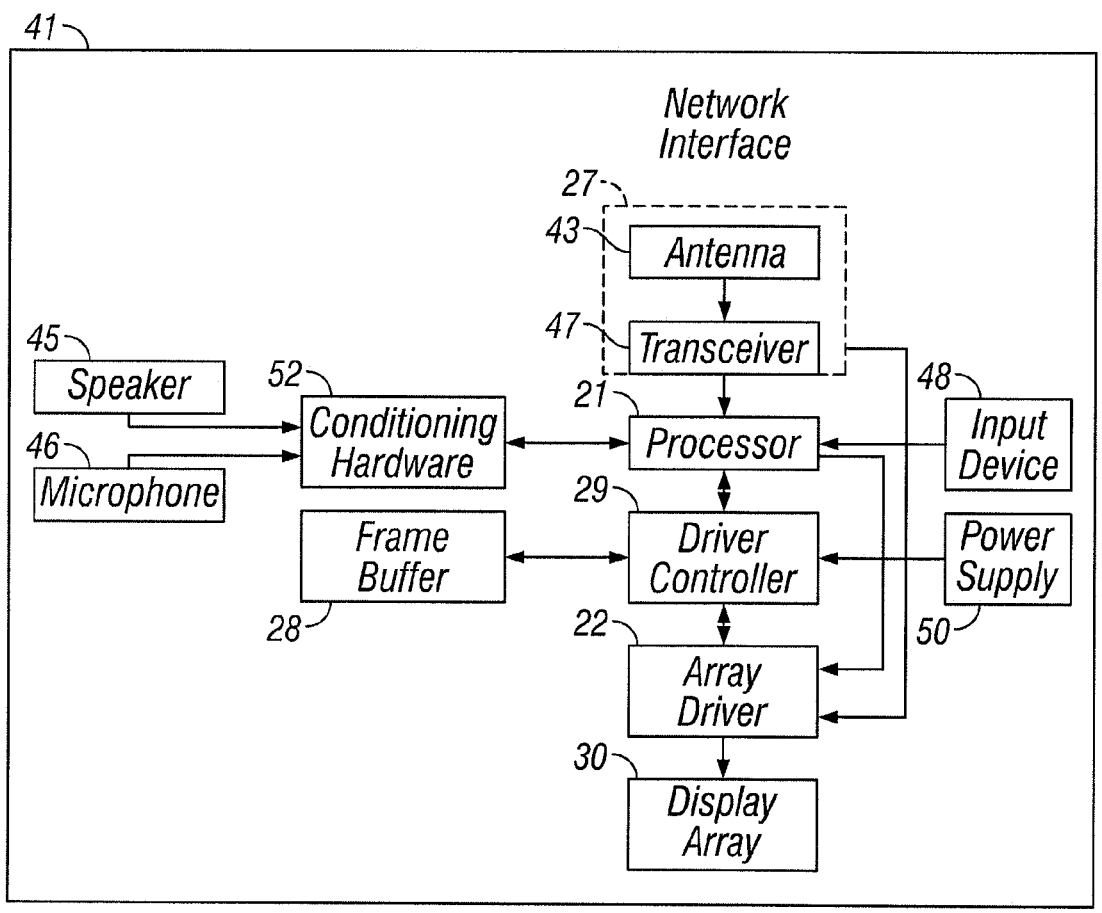

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
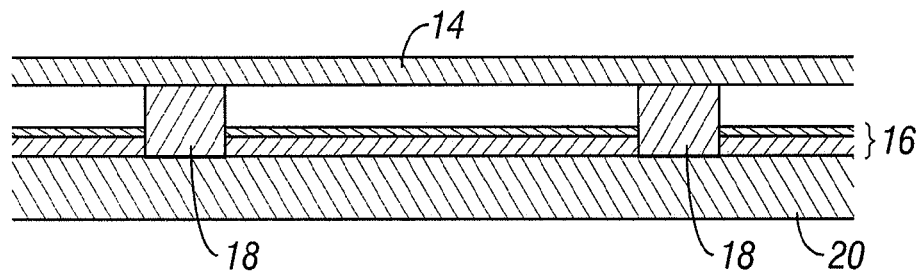
FIG. 7A is a cross section of the device of FIG. 1.
Figure 7B:
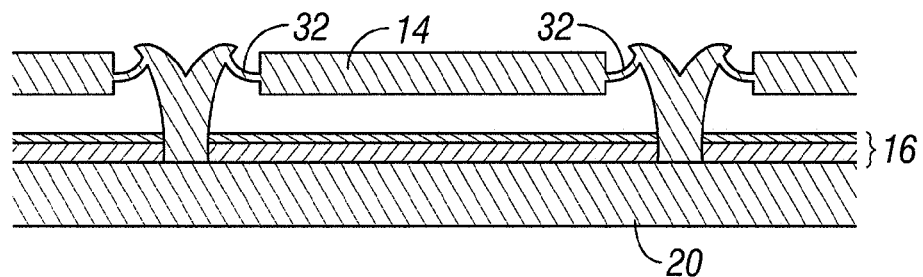
FIG. 7B is a cross section of an alternative embodiment of an interferometric modulator.
Figure 7C:
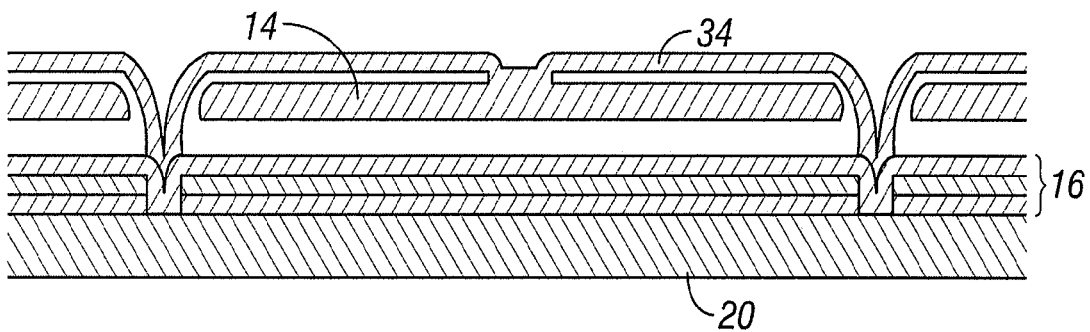
FIG. 7C is a cross section of another alternative embodiment of an interferometric modulator.
Figure 7D:
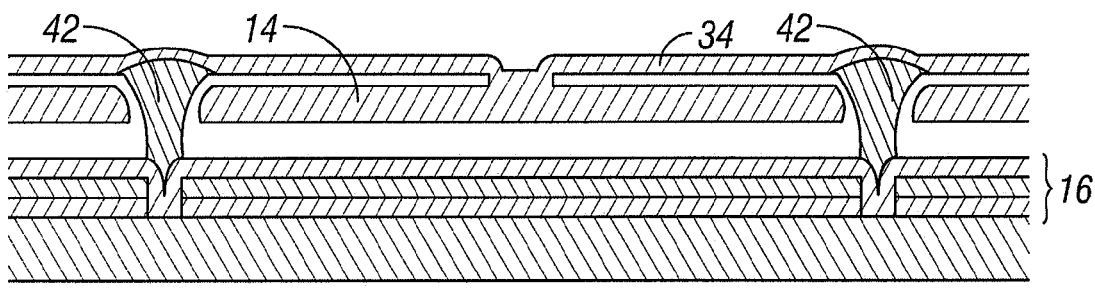
FIG. 7D is a cross section of yet another alternative embodiment of an interferometric modulator.
Figure 7E:
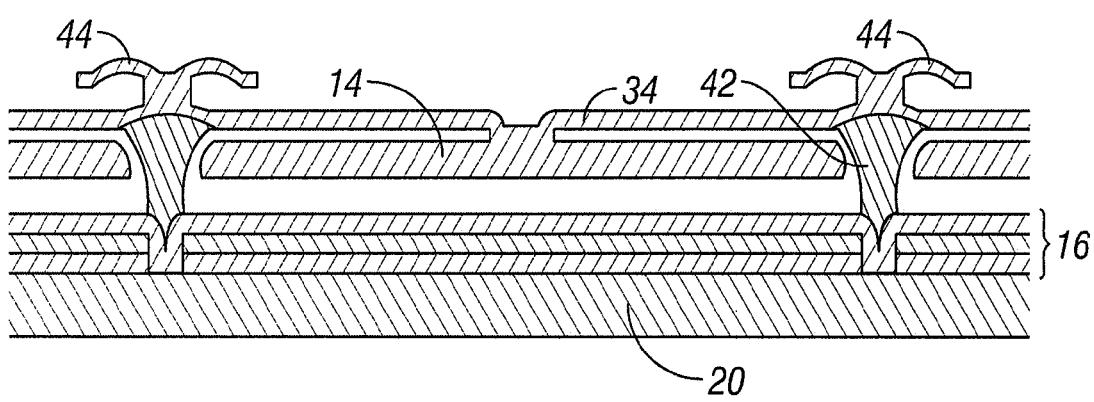
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

In certain embodiments, an interferometric modulator device may use a diffuser layer to obfuscate optical defects from the viewer's perception. The diffuser layer may comprise a polymer film, for example, polyester or polycarbonate, having a thickness from about 50 μm to about 100 μm. The diffuser layer may be advantageously coupled with the light direction layer based on their respective indices of refraction in order to avoid reducing the optical performance of the device, such as by both reducing contrast for ambient light and scattering ambient light within the light direction layer, which reduces front light brightness and creates non-uniformity issues.

Accordingly, in certain embodiments a display device may be fabricated that does not allow ambient light propagating within the light direction layer to leak into the diffuser layer, inhibiting performance of the display.

Figure 8:
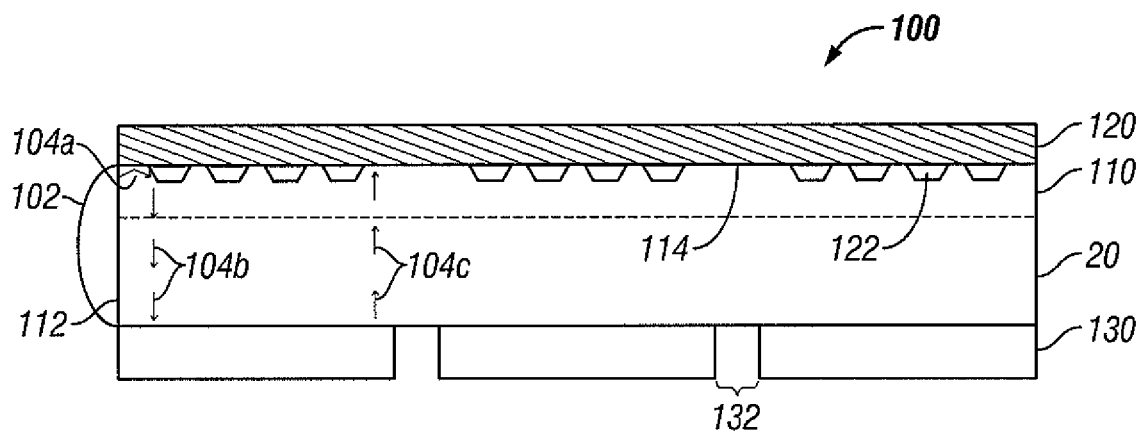
FIG. 8 is a cross section of one embodiment of an interferometric modulator array with a physically integrated diffuser layer that is optically isolated.

FIG. 8 illustrates a cross section of one embodiment of an array 100 comprising a transparent substrate 20, a light direction layer 110 and a diffuser layer 120. In one embodiment the array 100 is an array of interferometric modulators.

A light source 102, such as an LED, is connected to the transparent substrate 20 such that light 104 (represented by reference numerals 104*a* and 104*b*) emitted from the light source 102 enters the transparent substrate 20 and the light direction layer 110. In the embodiment illustrated in FIG. 8, the light source 102 is connected to a side surface 112 of the light direction layer 110 and the transparent substrate 20. In other embodiments, the light source 1 02 may be connected to a side surface of just the light direction layer 110. The structure of the light direction layer 110 is optimized so that light 104 passing from the light source 102 into the transparent substrate 20 and the light direction layer 110 is redirected toward an array of elements 130. Although a single ray 104 of light is depicted in FIG. 8 and subsequent figures, it should be understood that the light source 102 emits a beam of light having a given divergence and thus fills the entire transparent substrate 20 with light. Accordingly, a plurality of beams of light will be redirected toward the elements 130. The majority of light from the light source 102 which does not contact the interface 114 between the diffuser layer 120 and the light direction layer 110 at a substantially perpendicular angle to the interface 114 to the diffuser layer 120 will not leak into the diff-user layer 120, as discussed in further detail below. Preferably the light is directed in as narrow beams as possible. Thus, as used herein, the term "light 104" represents beams of light and illustrates one of numerous light paths within those beams.

The light source 102, as well as other light sources described herein, may be any suitable light source known in the art. Non-limiting examples include LEDs or fluorescent lights such as Cold Compact Fluorescent Lights.

In one embodiment, light 104*a* emitted by light source 102 is maintained within the light direction layer 110 and substrate 20 by total internal reflection until the light 104*a* is redirected through the light direction layer 110 and substrate 20 into the elements 130. The light direction layer 110 may comprise a number of grooves 122 that provide surfaces off of which light 104a may be reflected and redirected toward the elements 130. In certain embodiments, the grooves 122 contain air that is trapped in the space between the diffuser layer 120 and the light direction layer 110. In other embodiments, the grooves 122 contain a low refractive index material. Advantageously, light 104b may be redirected toward the elements 130 in a narrow beam that is substantially perpendicular to the front surface of the substrate 20. Advantageously, the majority of light 104b that is transmitted through the light direction layer 110 and substrate 20 and directed into elements 130 is reflected out of the elements 130 without being significantly affected by the grooves 122.

In one embodiment, the reflecting structures 122 in the light direction layer 110 are spaced such that light is directed to the elements 130 and not to the gap between the elements 132, as shown in FIG. 8. In one embodiment, the elements 130 are interferometric modulators. In another embodiment the system is adapted for use as a backlight in a transmissive or transflective display. In other embodiments the elements are other optical devices capable of reflecting light of a desired wavelength. By directing the light 104a from the front light 102 directly into the interferometric modulator elements 130, the brightness of the display is increased compared to use of ambient light alone, particularly in situations in which there is limited ambient light. In addition, this arrangement allows for the use of the display in situations in which there is little or no ambient light. In addition to grooves, one of skill in the art will recognize that other structures can be utilized in the light direction layer 110 to redirect light from the light source 102 into the elements 130 at the desired angle. For example, strips or lines of reflective material may be incorporated within or placed on the light direction layer 110 at a diagonal angle. Light may be reflected off of a strip of the reflective material at an angle related to the material's diagonal angle and towards the elements 130, in a manner similar to the manner described above with reference to the grooves 122.

In the embodiment illustrated in FIG. 8, because the majority of the light 104c is reflected out of the interferometric modulator elements 130 at an angle substantially perpendicular to the front surface substrate 20, the light 104c is reflected into diffuser layer 120 at an angle substantially perpendicular to the front surface of the diffuser layer 120. Consequently, and as will be discussed in further detail below, most light from the light source 102 does not directly leak into the diffuser layer 120. However, light 104c tended to be viewed as reflected from the interferometric modulator elements 130 is viewable because it interfaces with the diffuser layer 120 at a substantially perpendicular angle.

As further illustrated in FIG. 8, the diffuser layer 120 acts as a cover layer over the light direction layer 110. In certain embodiments, the diffuser layer 120 has a lower index of refraction than the light direction layer 110 and the transparent substrate 20 so that total internal reflection occurs at the interface 114 between the diffuser layer 120 and the light direction layer 110. As a result, most light 104a from the light source 102 does not penetrate into the diffuser layer 120. Consequently, the diffuser layer 120 is coupled with the light direction layer 110 without interacting with the light 104a propagating in the light direction layer 110 and substrate 20. Instead, light 104a from the light source 102 is reflected off of the interface 114 and redirected back into the light guide, where it contacts a groove 122 and is then redirected toward the elements 130. In certain embodiments, the difference in the refractive index between the diffuser layer 120 and the light direction layer 110 and transparent substrate 20 is directly proportional to the range of incidence angles over which the light 104 undergoes total internal reflection.

In certain embodiments, the refractive index range of the diffuser layer 120 is between 1.4 and 1.7. Suitable material candidates for the diffuser layer 120 which fall within this range include transparent or translucent polymer resin, for example, silicones, polyester, polycarbonate, polyvinyl chloride (PVC), polyvinylidene chloride, polystyrene, polyacrylates, polyethylene terephthalate, polyurethane, Zylar, and copolymers or blends thereof. In other embodiments other materials are used. In some embodiments, the diffuser layer 120 is a composite comprising a polymer resin as described above and one or more other components. In some embodiments, the other component is inorganic. In other embodiments, the other component is organic. In some embodiments, the other component may be optical beads dispersed within the diffuser layer 120. In other embodiments, the diffuser layer 120 comprises a film coated with micron-sized optical beads. In certain embodiments, the diffuser layer 120 is a diffractive diff-user comprising diffractive surface relief on a thin plastic film. In other embodiments, the diffuser layer 120 is a pressure sensitive adhesive comprising suspended diffusing particles. In some embodiments, the diffuser layer 120 made from an inorganic material. In some embodiments, the inorganic material comprises an oxide and/or nitride, for example, silica or alumina. In some embodiments, the inorganic material is crystalline. In other embodiments, the inorganic material is amorphous. In other embodiments other materials are used.

In some embodiments, the diffuser layer 120 is monolithic. The material from which the diffuser layer 120 is manufactured may be inherently diffusive. In some embodiments, a surface of the diff-user layer 120 is patterned to provide diffusion. Either the surface of the diffuser layer 120 proximal to the viewer, the surface distal to the viewer, or both are patterned. The diffusive patterns may comprise a random surface profile. Some embodiments use a combination of these diffusion mechanisms, for example, texturing a surface of an inherently diffusive material. In certain embodiments, the refractive index of the portion of the diffuser layer 120 proximal to the viewer has a lower index of refraction than the light direction layer 110 and transparent substrate 20, while the refractive index of the remaining portion of the diffuser layer 120 is unimportant.

In certain embodiments, the diffuser layer 120 is applied to the light direction layer 110 using an adhesive. In some embodiments, the adhesive is pre-applied to the diffuser layer 120. In other embodiments, the adhesive is applied to the light direction layer 110. Some embodiments use a two-part adhesive in which a first component is applied to the diffuser layer 120 and a second component is applied to the light direction layer 110. In some embodiments, the adhesive is pressure sensitive. In some embodiments, the adhesive is thermosetting. In other embodiments, the adhesive cures at about ambient temperature. In other embodiments, the adhesive is radiation-cured.

In some embodiments, the diffuser layer 120 is fabricated on the light direction layer 110. For example, in some embodiments, an uncured polymer resin is applied to the light direction layer 110 by means known in the art, for example, by spin coating, or calendaring. The polymer resin is then cured to form the diffuser layer 120. In other embodiments, the diffuser layer 120 is comprised of a plastic film with a diffuser pressure sensitive adhesive, as discussed above.

In some embodiments, the diffuser layer 120 is 200 μm thick. In other embodiments, the diffuser layer 120 is at least about 0.05 mm, at least about 0.1 mm, at least about 0.2 mm, or at least about 0.3 mm. In other embodiments the diffuser 120 is at least about 0.4 mm or at least about 0.5 mm. In some embodiments other thicknesses are also used.

In certain embodiments, the refractive index of the light direction layer 110 and the transparent substrate 20 is substantially equal. In certain embodiments, refractive indices are considered substantially equal if their values are within 2% of one another. For example, a substrate 20 with a refractive index of 1.52 may be coupled with a light direction layer 110 with a refractive index range between 1.49 and 1.54. As discussed herein, the refractive index of the light direction layer 110 will substantially equal the refractive index of the substrate 20 unless stated otherwise, although in other embodiments the refractive index of the light direction layer 110 may be less than the refractive index of the substrate 20.

In certain embodiments, the refractive index range of the light direction layer 110 is between 1.40 and 1.65. Suitable material candidates for the light direction layer 110 which fall within this range include Zylar, polymethyl methacrylate, or polycarbonate. In some embodiments the light direction layer 110 is between 175 and 254 microns thick. In some embodiments other thicknesses are also used.

The light direction layer 110 contains grooves 122 that may be constructed by injection molding, controlled etching, or by any other process known to those of skill in the art. In one embodiment, the light direction layer 110 is a thin film containing surface relief. The light direction layer 110 is thus also commonly referred to as a surface relief layer. Surface relief may be achieved using thin film embossing technology.

In certain embodiments, as discussed above, the substrate 20 and the light direction layer 110 are distinct objects, although in certain other embodiments, they are a single object such that the substrate 20 may include a light direction layer 110. In certain embodiments where the light direction layer 110 and substrate are distinct, the light direction layer 110 may be placed against the substrate 20 as depicted in FIG. 8, or in a position such that there is a space between the light direction layer 110 and the substrate 20.

In certain embodiments, the substrate 20 may comprise a transparent material such as, for example, glass, plastic, silica, alumina, and the like. In some embodiments the substrate 20 is less than about 0.5 mm thick, for example, up to about 0.45 mm thick, or about 0.4 mm thick, or about 0.35 mm thick. In some embodiments the substrate 20 is 700 microns thick. In some embodiments the substrate 20 is no more than about 0.3 mm thick, about 0.25 mm thick, or about 0.2 mm thick. In other embodiments, the substrate 20 has a thickness of not great than about 0.15 mm thick or about 0.1 mm. In some embodiments other thicknesses are also used.

Figure 9:
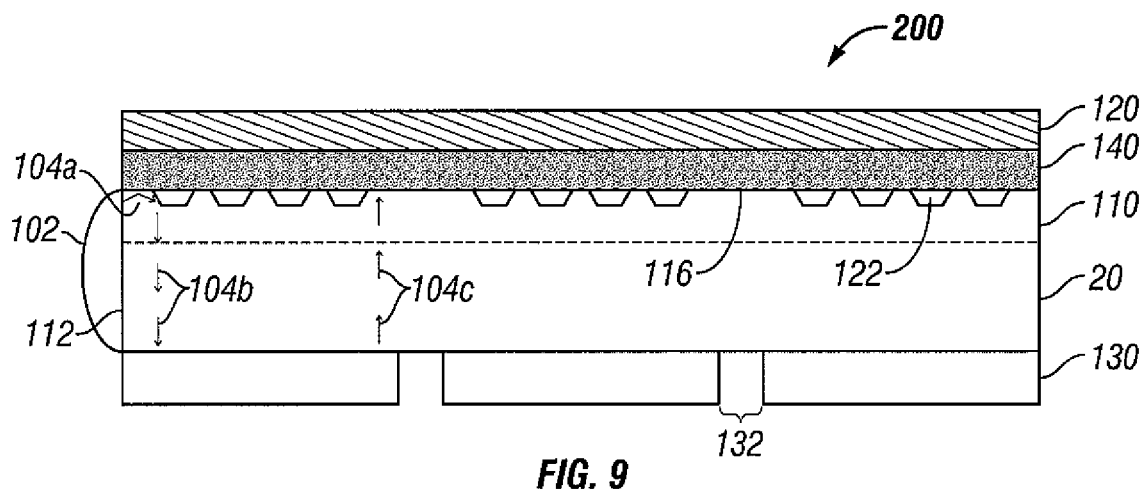
FIG. 9 is a cross section of an alternative embodiment of an interferometric modulator array with a physically integrated diffuser layer that is optically isolated.

FIG. 9 illustrates a cross section of another embodiment of an array 200 comprising a transparent substrate 20, a light direction layer 110, a diffuser layer 120 and a high reflectance thin film 140. In one embodiment the array 200 is an array of interferometric modulators.

A high reflectance thin film 140 is located between the diffuser layer 120 and the light direction layer 110. In certain embodiments, the high reflectance thin film 140 has a lower index of refraction than the light direction layer 110 and the transparent substrate 20 so that total internal reflection occurs at the interface 116 between the high reflectance thin film 140 and the light direction layer 110. In certain embodiments, the difference in the refractive index between the high reflectance thin film 140 and the light direction layer 110 and transparent substrate 20 is directly proportional to the range of incidence angles over which the light 104 undergoes total internal reflection.

In certain embodiments, the refractive index range of the high reflectance thin film 140 is between 1.45 and 1.7. Suitable material candidates for the high reflectance thin film 140 which fall within this range include silicon dioxide, silicon nitride, di-aluminium tri-oxide, indium tin oxide, and molybdenum chromium. In other embodiments, a stack of high reflectance thin film materials are used. Suitable material candidates for high reflectance thin films to contain in a stack whose refractive index falls within this range include silicon nitride and silicon oxide. In certain embodiments, the films used in the stack alternate between high and low refractive index materials. In some embodiments the high reflectance thin film 140 is between 200 and 300 nanometers thick. In some embodiments other thicknesses are also used.

In certain embodiments, the high reflectance thin film 140 is applied to the light direction layer 110 directly, while in other embodiments the high reflectance thin film 140 is deposited, such as by resistive evaporation or sputtering, onto a plastic film that is in turn applied to the light direction layer 110.

In certain embodiments, the diffuser layer 120 is in contact with the high reflectance thin film 140, as shown in FIG. 9. In other embodiments, the diffuser layer 120 may be separated from the high reflectance thin film, such as by a different glass substrate.

In certain embodiments, the diff-user layer 120 may be physically coupled to either a high reflectance film 140, as shown in FIG. 9, or to a light direction layer 110, as shown in FIG. 8. In such embodiments, even though all or part of the layer 120 may be physically in contact with the adjacent layer, the adjacent layer may nevertheless be optically distinct from the diffuser layer 120, in that at least certain light incident at particular angles may not travel from the adjacent layer into the diffuser layer 120. In particular, in embodiments in which the adjacent layer has a higher refractive index than the diffuser layer 120, light incident at a shallow angle upon the boundary between the adjacent layer and the diffuser layer 120 at a shallow angle may undergo total internal reflection and propagate within the adjacent layer, rather than entering the diffuser layer 120. It will be understood, however, that description of such layer as optically distinct does not preclude light from entering the diffuser layer 120, as light incident upon the boundary at a sufficiently steep angle will not undergo total internal reflection, and will enter the diffuser layer 120, as described above.

In certain embodiments, the features, dimensions and materials of the array 200 are the same as or similar to the features, dimensions and materials of the array 100 discussed above with reference to FIG. 8, excluding the refractive index of the diffuser layer 120.

Thus, in certain embodiments discussed herein, an interferometric modulator device may advantageously use a diffuser layer to obfuscate optical defects from the viewer's perception, enhancing an image without reducing the optical performance of the device, such as by both reducing contrast for ambient light and scattering ambient light within the light direction layer, the latter of which reduces front light brightness and creates non-uniformity issues.

Accordingly, while the above detailed description has shown, described, and pointed out novel features as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A reflective display including a plurality of display elements, the reflective display comprising:
   a transparent substrate;
   a light direction layer disposed on the substrate, the light direction layer configured to direct at least a portion of light propagating within said light direction layer toward the substrate and said plurality of display elements; and
   a diffuser layer physically coupled to and optically distinct from the light direction layer such that, as a result of total internal reflection, at least certain light propagating within said light direction layer that is incident on a surface of the diffuser layer at particular angles does not travel into said diffuser layer, wherein the light direction layer is between the diffuser and the transparent substrate and said diffuser layer is physically coupled to said light direction layer through said surface of said diffuser layer.

2. The display of claim 1, wherein the refractive index of the diffuser layer is less than the refractive index of the light direction layer.

3. The display of claim 1, further comprising a light source positioned between planes defined by said substrate and said diffuser layer, wherein said light source provides said incident light.

4. The display of claim 1, wherein said light direction layer has a refractive index range between 1.40 and 1.65.

5. The display of claim 1, wherein said light direction layer has a thickness of between 175 and 254 microns.

6. The display of claim 1, wherein said light direction layer is composed of materials including Zylar, polymethyl methacrylate, or polycarbonate.

7. The display of claim 1, wherein the diffuser layer is approximately 25 microns thick.

8. The display of claim 1, wherein the diffuser layer comprises a diffusive film disposed on a clear pressure sensitive adhesive layer.

9. The display of claim 1, wherein said diffuser layer is composed of materials including transparent or translucent polymer resin.

10. The display of claim 1, wherein the diffuser is in contact with at least a portion of a surface of the light propagation layer.

11. The display of claim 1, additionally comprising a light source, wherein at least a portion of the light source is edge coupled to the transparent substrate.

12. The display of claim 1, wherein the diffuser layer is adhered to the light direction layer using adhesive.

13. The display of claim 1, wherein the diffuser layer is fabricated on the light direction layer.

14. The display of claim 1, wherein the light direction layer comprises a plurality of surfaces configured to direct at least a portion of light propagating within said light direction layer toward the substrate and said plurality of display elements.

15. The display of claim 1, wherein the light direction layer comprises a plurality of grooves.

16. The display of claim 1, the light direction layer comprising a plurality of light redirectors.

17. The display of claim 16, wherein said light redirectors are defined by a non-uniform surface of the light direction layer in contact with at least a portion of the diffuser layer.

18. The display of claim 1, further comprising:
   a processor that is configured to communicate with said display elements, said processor being configured to process image data; and
   a memory device that is configured to communicate with said processor.

19. The display of claim 18, further comprising a driver circuit configured to send at least one signal to the display.

20. The display of claim 19, further comprising a controller configured to send at least a portion of the image data to the driver circuit.

21. The display of claim 18, further comprising an image source module configured to send said image data to said processor.

22. The display of claim 21, wherein the image source module comprises at least one of a receiver, transceiver, and transmitter.

23. The display of claim 18, further comprising an input device configured to receive input data and to communicate said input data to said processor.

24. The display of claim 1, wherein the display elements comprise reflective display elements disposed on the opposite side of the transparent substrate from the light direction layer.

25. The display of claim 24, wherein the display elements comprise interferometric modulators.

26. The display of claim 24, wherein at least a portion of the light directed towards said display elements is reflected by the display elements towards the diffuser layer to produce an image viewable through the diffuser layer.

27. A reflective display including a plurality of display elements, the reflective display comprising:
   a transparent substrate comprising forward and rearward surfaces and a plurality of sides between said forward and rearward surfaces, said sides being thin in comparison to the expanse of said forward and rearward surfaces;
   an edge coupled light source, wherein at least a portion of the light source is optically coupled to one of said sides of the transparent substrate such that light emitted;
   by the light source passes through said one of said sides of the substrate into the substrate and propagates within the transparent substrate;
   a light direction layer disposed on the substrate, the light direction layer including a plurality of light redirectors configured to direct at least a portion of the light propagating within the substrate back toward the substrate and the plurality of display elements;
   a high reflectance film disposed on the light direction layer; and
   a diffuser layer physically coupled to and optically distinct from the light direction layer, wherein the high reflectance film is located between the diffuser layer and the light direction layer to physically couple the diffuser layer to the light direction layer, and wherein light incident on a surface of the high reflectance film at particular angles does not travel from the light direction layer into said diffuser layer.

28. The display of claim 27, wherein said reflectance film has a refractive index range between 1.4 and 1.7.

29. The display of claim 27, wherein said reflectance film has a thickness of between 200 and 300 nanometers.

30. The display of claim 27, wherein the reflectance film is comprised of silicon dioxide, silicon nitride, di-aluminium tri-oxide, indium tin oxide, or molybdenum chromium.

31. The display of claim 27, wherein the reflectance film is comprised of dielectric films of alternating high and low refractive index materials.

32. The display of claim 31, wherein the high refractive index material includes silicon nitride and the low refractive index material includes silicon oxide.

33. The display of claim 27, the reflectance film having a lower index of refraction tan the light direction layer.

34. The display of claim 27, wherein a surface of the light propagation layer adjacent the high reflectance film comprises a non-uniform surface.

35. The display of claim 27, wherein the sides of said substrate are less than about 0.5 mm thick.

36. The display of claim 27, wherein the plurality of light redirectors comprises a plurality of grooves.

37. The display of claim 27, wherein the high reflectance film is in contact with at least a portion of a surface of the light direction layer.

38. The display of claim 37, wherein the high reflectance film is in contact with at least a portion of a surface of the diffuser layer.

39. The display of claim 27, wherein the display elements comprise reflective display elements disposed on the opposite side of the transparent substrate from the high reflectance film.

40. The display of claim 39, wherein the display elements comprise interferometric modulators.

41. The display of claim 39, wherein at least a portion of the light directed towards said display elements is reflected by the display elements towards the diffuser layer to produce an image viewable through the diffuser layer.

* * * * *